No. 652,534.  
T. CROIL.  
MOTOR VEHICLE.  
(Application filed Mar. 5, 1900.)  
Patented June 26, 1900.

(No Model.)

2 Sheets—Sheet 1.

Fig. 1.

Witnesses:

Inventor,
Thomas Croil
By Benedict & Morsell
Attorneys.

No. 652,534. Patented June 26, 1900.
T. CROIL.
MOTOR VEHICLE.
(Application filed Mar. 5, 1900.)
(No Model.) 2 Sheets—Sheet 2.
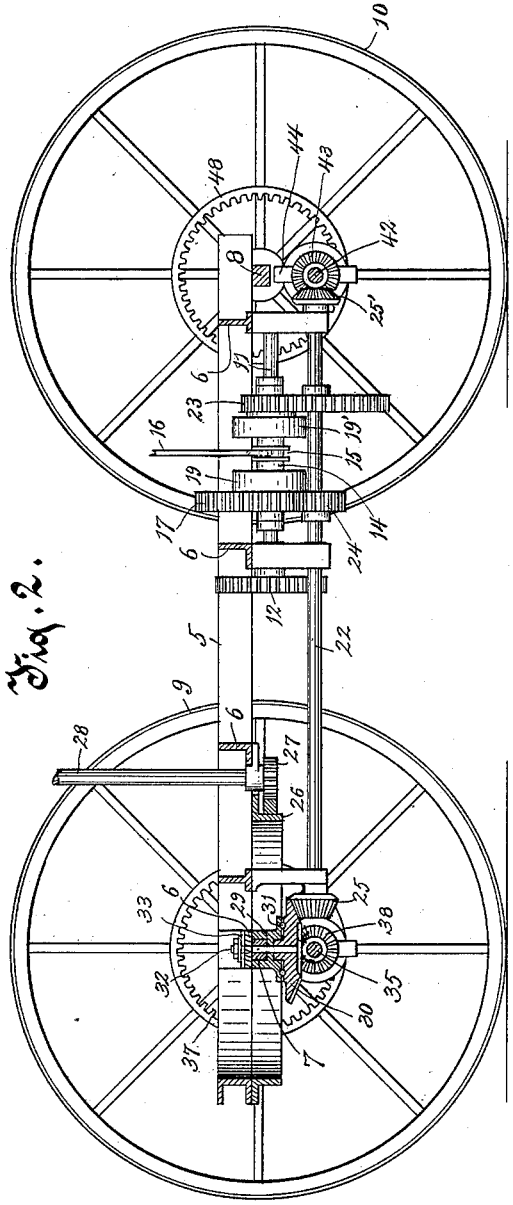
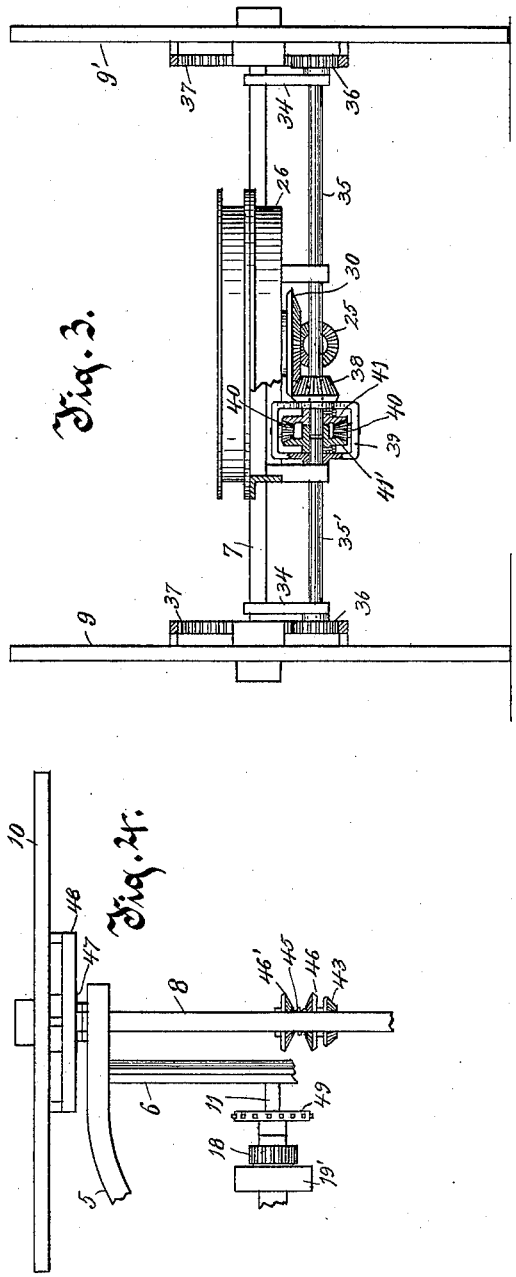
Witnesses.
Inventor.
Thomas Croil
By Benedict and Morsell
Attorneys.

UNITED STATES PATENT OFFICE.

THOMAS CROIL, OF MILWAUKEE, WISCONSIN.

MOTOR-VEHICLE.

SPECIFICATION forming part of Letters Patent No. 652,534, dated June 26, 1900.

Application filed March 5, 1900. Serial No. 7,347. (No model.)

*To all whom it may concern:*

Be it known that I, THOMAS CROIL, of Milwaukee, in the county of Milwaukee and State of Wisconsin, have invented a new and useful Improvement in Motor-Vehicles, of which the following is a description, reference being had to the accompanying drawings, which are a part of this specification.

My invention has relation to improvements in motor-vehicles of that character known as "horseless" vehicles.

The primary object of the invention is to provide an improved construction wherein the traction-wheels may be permitted to be carried loosely on a non-rotatable axle with means for positively driving or rotating said wheels on the axle, while at the same time permitting of the free swinging of the axle for the purpose of turning or steering the vehicle.

A further object resides in the improved construction whereby both the front and rear traction-wheels are carried loosely on non-rotatable axles with means for positively driving or rotating said wheels on the axles, while at the same time permitting of the free swinging of the front axle for the purpose of turning or steering the vehicle.

With the above primary and other incidental objects in view the invention consists of the devices and parts or their equivalents, as hereinafter set forth.

In the accompanying drawings, Figure 1 is a plan view of the invention, parts in section and parts broken away. Fig. 2 is a longitudinal central section. Fig. 3 is a view of the forward end, parts in section; and Fig. 4 is a view of a modified form, showing a sprocket-wheel on the counter-shaft for a chain connection leading from a sprocket-wheel on the motor-shaft.

The frame of the vehicle may be of any desirable form best adapted for supporting the working parts. The frame shown in the drawings consists of a U-shaped main portion 5, with the rounded end thereof at the front of the vehicle, and connecting transverse stays or braces 6. The front axle is indicated by the numeral 7 and the rear axle by the numeral 8. These axles are non-rotatable, and on the ends of the front axle turn loosely the front driving-wheels 9 9', while on the rear axle turn loosely the rear driving-wheels 10 10'.

A counter-shaft 11 is journaled in suitable bearings, and near one end of this shaft is mounted fast a gear-wheel 12. A gear-wheel (not shown and forming part of the motor mechanism) meshes with the gear-wheel 12, and through which meshing engagement rotation is imparted to the counter-shaft. Slidingly mounted on a feather 13 on the counter-shaft is a collar 14, said collar provided with an annular groove 15, which is adapted to be engaged by the forked end of a shifting lever 16. Mounted loosely on the counter-shaft is a large gear-wheel 17 and a smaller gear wheel or pinion 18. Projecting laterally from one face of the gear-wheel 17 is a sleeve or ring 19, and projecting from the opposed face of the pinion 18 is a similar sleeve or ring 19'. The collar 14 is disposed on the counter-shaft intermediate of the two wheels 17 and 18, and said collar has pivoted thereto, at opposite ends thereof, sets of links 20 20 and 20' 20', the outer ends of said links being pivotally connected to bands 21 21'. These bands fit in the sleeves or rings 19 19'. This, of course, provides for clutching either the gear-wheel 17 or the pinion 18 to the counter-shaft, so as to rotate with said shaft, as it is evident that if the collar 14 is shifted by means of its lever in a direction toward the gear-wheel 17 the links 20 20 of the collar will force the band 21 in firm engagement with the ring 19, and thereby clutch the gear-wheel 17 to the shaft, while on the reverse movement of the collar the links 20' 20' at the opposite end of said collar will force the band 21' against the sleeve or ring 19', and thereby clutch the pinion 18 to the counter-shaft.

The numeral 22 indicates a main shaft extending longitudinally of the frame and journaled in suitable bearings depending from the transverse braces 6. This shaft has mounted fast thereon a large gear-wheel 23 and a smaller gear wheel or pinion 24. The former meshes with the pinion 18 of the counter-shaft, and the latter meshes with the gear-wheel 17 of said counter-shaft. At the forward end of the shaft 22 is carried a beveled gear-wheel 25 and at the rear end thereof a similar beveled gear-wheel 25'.

Beneath the main frame at the forward end of the vehicle is a fifth-wheel 26, and adapted to engage with this fifth-wheel is a pinion 27, said pinion carried at the lower end of a steering-rod 28. The front axle 7 passes through the fifth-wheel, and said axle is also seated in a recess in a boxing 29. The lower end of this boxing bears against the upper side of a horizontally-arranged beveled gear-wheel 30, antifriction-balls 31 being interposed between the boxing and the gear-wheel. This horizontal beveled gear-wheel 30 rotates freely on the lower end of a king-bolt 32, and said king-bolt passes through the boxing 29 and through a block 33, resting on the top of the front cross-bar 6, the head of the bolt or a nut thereon bearing against the block. The beveled gear-wheel 25 at the forward end of the main shaft 22 meshes with the horizontal beveled gear-wheel 30, as clearly shown.

Journaled in suitable bearings 34 34, depending from the front axle, is a two-part shaft, the two sections thereof being designated, respectively, by the numerals 35 35'. Each shaft-section carries on its outer end a gear-wheel 36. These gear-wheels mesh with annularly-arranged teeth 37 37, rigid with the inner sides of the forward driving-wheels, and hence when the shaft-sections are rotated said driving-wheels will be rotated by the described gearing. On the shaft-section 35 is mounted loosely a beveled gear-wheel 38, which meshes with the horizontal beveled gear-wheel 30. This beveled gear-wheel 38 has formed rigid therewith and projecting laterally therefrom a yoke 39, which yoke loosely surrounds the inner ends of both of the shaft-sections. This yoke carries a beveled pinion or a plurality of beveled pinions 40. I show two of such pinions in the accompanying illustration of my invention; but it will be understood that only one may be employed, if desired, or more than two, as may be preferred. These pinions are interposed between and mesh with beveled gear-wheels 41 41', arranged within the yoke. The beveled gear-wheel 41 is fast on the end of the shaft-section 35, and the beveled gear-wheel 41' is fast on shaft-section 35'.

At the rear end of the vehicle and below the rear axle 8 is another two-part shaft, the sections thereof being designated, respectively, by the numerals 42 42'. The inner end of section 42 carries loosely thereon a beveled gear-wheel 43, which is in mesh with the beveled gear-wheel 25' at the rear end of the main shaft 22. A yoke 44, similar to the yoke 39 at the forward end of the vehicle, is rigid with this gear-wheel and projects laterally therefrom. This yoke also carries one or more beveled pinions 45, which are in meshing engagement with beveled gear-wheels 46 and 46', fast on the respective shaft-sections 42 42'. The shaft-sections 42 42' have mounted fast on their outer ends gear-wheels 47 47', which mesh with annularly-arranged teeth 48 48, rigid with the inner sides of the rear driving-wheels 10 10'.

In the operation of my invention the motor is first started and the rotation of the motor-shaft is imparted to the counter-shaft in the manner hereinbefore described. The mechanism before described comprehended the employment of a gear-wheel on the motor-shaft meshing with the gear-wheel 12 on the counter-shaft. If preferred, however, a sprocket-wheel (not shown) may be employed on the motor-shaft, and the rotation of this sprocket-wheel may be imparted to the counter-shaft by means of a sprocket-chain, (not shown,) said sprocket-chain passing around a sprocket-wheel 49 on the counter-shaft, as shown in the modified form of construction illustrated in Fig. 4. Now if the large gear-wheel 17 is clutched to the counter-shaft, said gear-wheel will, through its meshing engagement with the pinion 24 on the main shaft, cause the vehicle to be propelled at fast speed, whereas if the pinion 18 is clutched to the counter-shaft said pinion will, through its meshing engagement with the large gear-wheel 23 on the main shaft, cause the vehicle to be propelled at slow speed. The rotation of the main shaft will be communicated to the front shaft-sections 35 35' through the meshing engagement of the beveled gear-wheel 25 with the horizontal beveled gear-wheel 30 and the engagement of said beveled gear-wheel 30 in turn with the beveled gear-wheel 38. The rotation of the front shaft-sections 35 35' will be communicated to the front driving-wheels through the engagement of the gear-wheels 36 36 with the annularly-arranged teeth 37 37. The rotation of the main shaft will be imparted to the rear shaft-sections 42 42' through the meshing engagement of the beveled gear-wheel 25' with the beveled gear-wheel 43, and the rotation of said rear shaft-sections will be communicated to the rear driving-wheels by means of the engagement of the gear-wheels 47 47 with the annularly-arranged teeth 48 48. If the machine is moving along in a straight line, the rotation of the beveled gear-wheels 38 and 43 will of course carry the yokes 39 and 44 around therewith, and as these yokes revolve the beveled pinions 40 and 45, carried, respectively, thereby, will be rotated therewith, and said beveled pinions being in engagement, respectively, with the beveled gear-wheels 41 41' at the front of the vehicle and the beveled gear-wheels 46 46' at the rear of the vehicle of course the front shaft-sections 35 35' rotate together, as likewise the rear shaft-sections 42 42', and consequently the front and rear traction-wheels will have a unitary rotation. If now it is desired to turn or cause the vehicle to move in a curve, the steering-rod 28 is turned in the proper direction, and this turning of the steering-rod will cause the pinion 27 to engage the fifth-wheel 26, which of course will shift the front axle 7 either from right to left, or vice versa, in accordance with the direction of turning of the steering-rod. If, for instance, the steering-rod is turned in a direction to swing the front wheel 9' around, the opposite front wheel 9 will be practically at a standstill, or will have a peripheral velocity of considerably-less relative speed than the peripheral velocity of the wheel 9'. The result will be that the yoke 39 in its rotation with the beveled gear-wheel 38 will carry the pinions 40 around therewith. The beveled gear-wheel 41', however, on the shaft-section 35' will be at a standstill, and consequently the beveled pinions 40 will only be effective in causing the rotation of the shaft-section 35 by reason of their meshing engagement with the beveled gear-wheel 41, whereas said beveled pinions 40 will merely run around the beveled gear-wheel 41' without causing any turning of said beveled gear-wheel 41'. When the rear end of the vehicle starts to turn in the direction referred to, the same action takes place at that end of the vehicle—that is to say, the beveled pinions 45 only turn the beveled gear-wheel 46—while the beveled gear-wheel 46' is unaffected, said beveled pinions 45 merely running around the beveled gear-wheel 46' without imparting rotation thereto. It is of course obvious that if the vehicle is turned in the opposite direction to that described exactly the opposite result will occur—that is to say, the beveled pinions 40 at the front of the vehicle will turn the beveled gear-wheel 41' at the front, while the beveled gear-wheel 41 will be unaffected, and the beveled pinions 45 at the rear will turn the beveled gear-wheel 46', while the beveled gear-wheel 46 will be unaffected.

While I have herein shown and described certain details of construction, yet I do not wish to be understood as limiting myself thereto, as modifications and variations may be resorted to without departing from the spirit and scope of my invention. For instance, the particular gearing herein shown and described for communicating rotation to the main shaft may be dispensed with and any other desirable means employed for transferring the rotation of the motor to the main shaft; and, furthermore, any means other than the particular gear-wheel 25 may be employed for transferring the rotation of the main shaft to the horizontally-mounted wheel 30 at the front of the vehicle and from said horizontally-mounted wheel to the front shaft, or means other than the gear-wheel 25' at the rear of the main shaft may be provided for transferring the rotation of said main shaft to the rear shaft. Furthermore, any desirable form of clutch mechanism may be employed on the counter-shaft without departing from the spirit and scope of my invention.

What I claim as my invention is—

1. In a motor-vehicle, the combination of a frame, a non-rotatable axle, traction-wheels mounted loosely thereon, means for swinging the axle, a horizontally-mounted wheel carried in line with the pivotal point of the axle, means for rotating said wheel, bearings so connected as to be swung with the axle, a shaft mounted in said bearings, said shaft having a wheel mounted thereon, means for transferring the rotation of the horizontally-mounted wheel to the wheel of the shaft, whereby said shaft is rotated, wheels on opposite ends of the shaft, and means for transferring the rotation of said wheels to the traction-wheels.

2. In a motor-vehicle, the combination of a frame, a front non-rotatable axle, traction-wheels mounted loosely on the axle, a bolt on which the axle is adapted to swing, a wheel mounted horizontally on the bolt, means for rotating said wheel, bearings so connected as to be swung with the axle, a shaft mounted in said bearings, said shaft having a wheel mounted thereon, means for transferring the rotation of the horizontally-mounted wheel to the wheel of the shaft, whereby said shaft is rotated, wheels on opposite ends of the shaft, and means for transferring the rotation of said wheels to the traction-wheels.

3. In a motor-vehicle, the combination of a frame, a non-rotatable axle, traction-wheels mounted loosely on the axle, means for swinging the axle, a horizontally-mounted gear-wheel carried in line with the pivotal point of the axle, means for rotating said wheel, bearings so connected as to be swung with the axle, a shaft mounted in said bearings, said shaft having a gear-wheel mounted thereon which is in mesh with the horizontally-mounted gear-wheel, whereby said shaft is rotated, wheels on opposite ends of the shaft, and means for transferring the rotation of said wheels to the traction-wheels.

4. In a motor-vehicle, the combination of a frame, a non-rotatable axle, traction-wheels mounted loosely on the axle, means for swinging the axle, a horizontally-mounted gear-wheel carried in line with the pivotal point of the axle, a main shaft having a gear-wheel in mesh with the horizontally-mounted gear-wheel, bearings so connected as to be swung with the axle, a shaft mounted in said bearings, said shaft having a gear-wheel mounted thereon which is in mesh with the horizontally-mounted gear-wheel, whereby said shaft is rotated, wheels mounted on opposite ends of the shaft, and means for transferring the rotation of said wheels to the traction-wheels.

5. In a motor-vehicle, the combination of a frame, a non-rotatable axle, traction-wheels mounted loosely on the axle, means for swinging the axle, a horizontally-mounted wheel carried in line with the pivotal point of the axle, means for rotating said wheel, bearings so connected as to be swung with the axle, a shaft mounted in said bearings, said shaft having a wheel mounted thereon, means for transferring the rotation of the horizontally-mounted wheel to the wheel of the shaft, whereby said shaft is rotated, wheels on opposite ends of the shaft, means for transferring the rotation of said wheels to the traction-wheels, and mechanism adapted to cause the traction-wheels to turn with a unitary rotary motion when the machine is moving along in a straight line, or to turn with relatively-different peripheral velocities when the machine is moving in a curved path.

6. In a motor-vehicle, the combination, of a frame, front and rear axles, traction-wheels mounted loosely thereon, means for swinging the front axle, a main shaft having gear-wheels on opposite ends thereof, a horizontally-mounted gear-wheel carried in line with the pivotal point of the front axle, said wheel being in mesh with the gear-wheel at the forward end of the main shaft, bearings so connected as to be swung with the front axle, a shaft mounted in said bearings, said shaft having a wheel mounted thereon, means for transferring the rotation of the horizontally-mounted wheel to the wheel of the front shaft, whereby said front shaft is rotated, wheels on opposite ends of the front shaft, means for transferring the rotation of said wheels to the front traction-wheels, a rear shaft having a gear-wheel mounted thereon, said gear-wheel being in mesh with the gear-wheel on the rear end of the main shaft, whereby said rear shaft is rotated, wheels on opposite ends of the rear shaft, and means for transferring the rotation of said wheels to the rear traction-wheel.

In testimony whereof I affix my signature in presence of two witnesses.

THOMAS CROIL.

Witnesses:
  A. L. MORSELL,
  ANNA V. FAUST.